US008868863B2

(12) United States Patent
Puttaswamy Naga et al.

(10) Patent No.: US 8,868,863 B2
(45) Date of Patent: Oct. 21, 2014

(54) METHOD AND APPARATUS FOR A FRUGAL CLOUD FILE SYSTEM

(75) Inventors: Krishna P. Puttaswamy Naga, Metuchen, NJ (US); Thyagarajan Nandagopal, Edison, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 206 days.

(21) Appl. No.: 13/348,847

(22) Filed: Jan. 12, 2012

(65) Prior Publication Data
US 2013/0185530 A1    Jul. 18, 2013

(51) Int. Cl.
  *G06F 12/00*  (2006.01)
  *G06F 12/08*  (2006.01)
  *G06F 12/02*  (2006.01)
  *G06F 3/06*   (2006.01)

(52) U.S. Cl.
  CPC .......... *G06F 12/0868* (2013.01); *G06F 12/02* (2013.01); *G06F 3/0608* (2013.01); *G06F 3/0631* (2013.01); *G06F 3/0653* (2013.01)
  USPC ........... 711/162; 711/161; 711/154; 711/202; 711/205; 711/207

(58) Field of Classification Search
  USPC ................. 711/161, 162, 154, 202, 205, 207
  See application file for complete search history.

(56) References Cited

U.S. PATENT DOCUMENTS

| 6,745,304 | B2 |   | 6/2004 | Playe |         |
|-----------|----|---|--------|-------|---------|
| 7,971,001 | B2 | * | 6/2011 | Petev et al. | 711/136 |
| 7,991,736 | B2 | * | 8/2011 | McBride et al. | 707/612 |

OTHER PUBLICATIONS

Brocade File Lifecycle Manager (FLM) 4.0 Administration Guide, May 29, 2007, 128 pages, Publication No. 53-1000596-01, Brocade Communications Systems, Inc.
Discussion Forums > Category: Amazon Web Services > Forum: Amazon Elastic Compute Cloud >Thread: How EBS snapshots' size calculated? Amazon Web Services, published online at: https://forums.aws.amazon.com/message.jspa?messageID=142082, posted 2009, © 2012, Amazon Web Services LLC or its affiliates.
Amazon Elastic Block Store (EBS), Amazon Web Services, published online at http://aws.amazon.com/ebs/, © 2012, Amazon Web Services LLC or its affiliates.
Amazon ElastiCache (beta), Amazon Web Services, published online at http://aws.amazon.com/elasticache/, © 2012, Amazon Web Services LLC or its affiliates.
Amazon Simple Storage Service FAQs, Amazon Web Services, published online at http://aws.amazon.com/s3/faqs/, © 2012, Amazon Web Services LLC or its affiliates.
Windows Azure Caching Service, Windows Azure Platform, Microsoft, published online at http://msdn.microsoft.com/en-us/library/windowsazure/gg278356.aspx, © 2012 Microsoft. Build Date: Dec. 12, 2011.
Chan, et. al., "Modeling and Dimensioning Hierarchical Storage Systems for Low-Delay Video Services", IEEE Transactions on Computers, vol. 52, No. 7, Jul. 2003, pp. 907-910.

(Continued)

*Primary Examiner* — Midys Rojas
(74) *Attorney, Agent, or Firm* — Carl Bilicska

(57) ABSTRACT

Various embodiments provide a method and apparatus of providing a frugal cloud file system that efficiently uses the blocks of different types of storage devices with different properties for different purposes. The efficient use of the different types of available storage devices reduces the storage and bandwidth overhead. Advantageously, the reduction in storage and bandwidth overhead achieved using the frugal cloud file system reduces the economic costs of running the file system while maintaining high performance.

24 Claims, 8 Drawing Sheets

(56) References Cited

OTHER PUBLICATIONS

David Isaac, "Hierarchical Storage Management for Relational Databases", Twelfth IEEE Symposium on Mass Storage Systems, IEEE, © 1993, pp. 139-144.

Anna R. Karlin, et. al., "Competitive Randomized Algorithms for Non-Uniform Problems", Proceedings of the first annual ACM-SIAM symposium on Discrete algorithms, Conference SODA90 ACM/SIGACT-SIAM Symposium on Discrete Algorithm, San Francisco, CA, USA—Jan. 22-24, 1990, Society for Industrial and Applied Mathematics Philadelphia, PA, USA © 1990, pp. 301-309.

Andrew W. Leung, et. al., "Measurement and Analysis of Large-Scale Network File System Workloads", Proceedings of the 2008 USENIX Annual Technical Conference, Boston, MA, Jun. 2008, 14 pages.

Nimrod Megiddo, et. al., "ARC: A Self-Tuning, Low Overhead Replacement Cache", Proceedings of FAST '03: 2nd USENIX Conference on File and Storage Technologies, USENIX Association. San Francisco, CA, USA, Mar. 31-Apr. 2, 2003, pp. 115-130.

Dushyanth Narayanan, et. al., "Write Off-Loading: Practical Power Management for Enterprise Storage", Microsoft Research Ltd., 6th USENIX Conference on File and Storage Technologies, USENIX, Feb. 26-29, 2008, San Jose, CA, USA, 15 pages.

ChoosingBlockSize, s3backer, published online at http://code.google.com/p/s3backer/wiki/ChoosingBlockSize, Updated: Feb. 4, 2010, © 2011 Google.

Hierarchical storage management, Wikipedia Article, published online at http://en.wikipedia.org/wiki/Hierarchical_storage_management, 4 pages, last modified Oct. 21, 2011.

John Wilkes, et. al., "The HP AutoRAID hierarchical storage system", Hewlett-Packard Laboratories, ACM Transactions on Computer Systems, vol. 14, No. 1, Feb. 1996, 15 pages.

Medha Bhadkamkar, et. al., "BORG: Block-reORGanization for Self-optimizing Storage Systems", 7th USENIX Conference on File and Storage Technologies, USENIX Association, 2009, pp. 183-196.

* cited by examiner

200

400

500

600

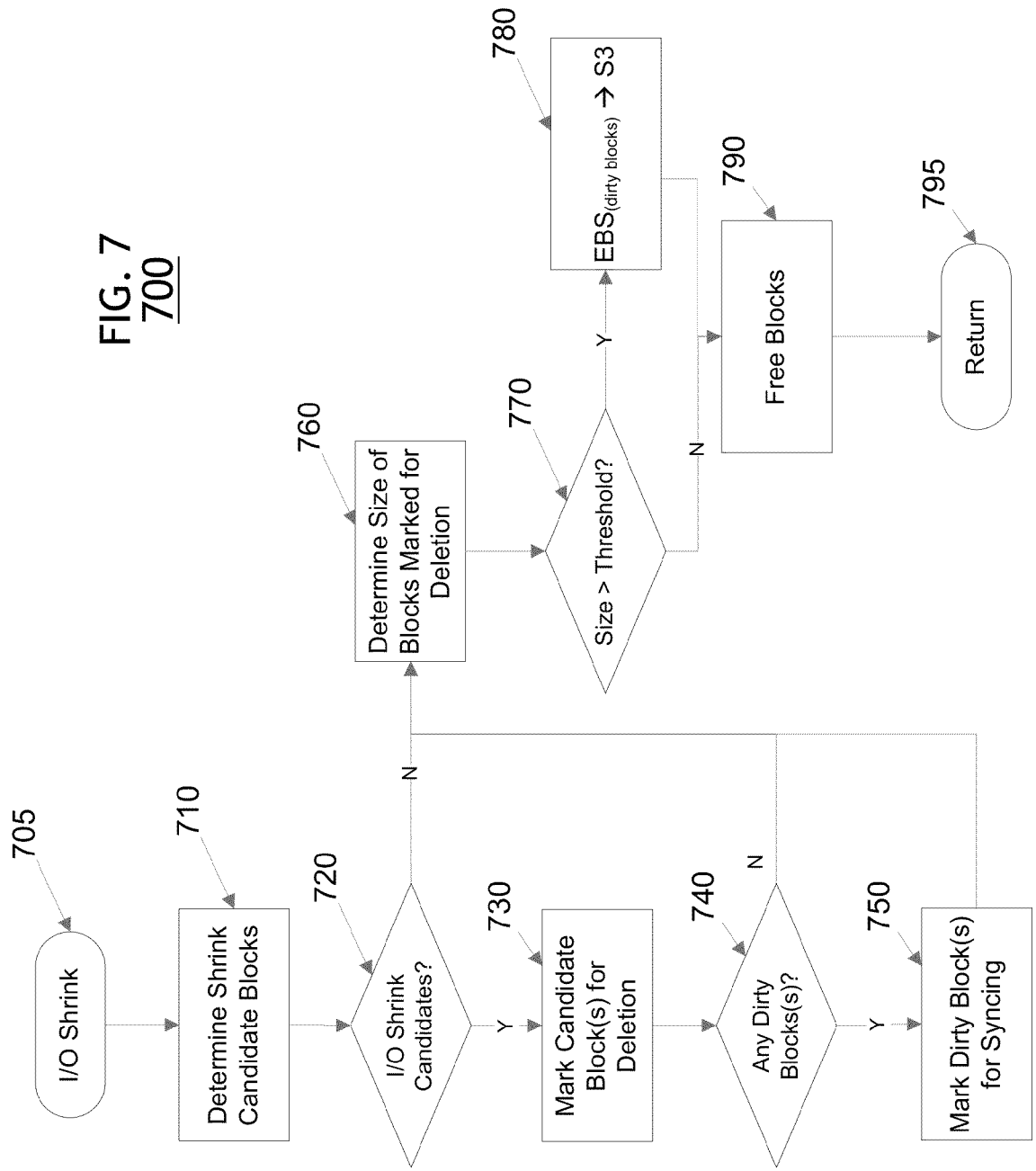

FIG. 8
800

```
Pseudocode 1 FCFS_Read(Disk, Cache)
 1: function Initialize()
 2:   Cache size, S = 1 GB; B_LRU = B_evict = 0; T ← f_d/m_c
 3: 
 4: function Access_Block(Block A) {// Every block read}
 5:   t ← current time
 6:   if A ∈ Cache then
 7:     Serve_Access_Request (A)
 8:   else { A ∉ Cache}
 9:     fetch A from Disk
10:     if Cache is full then
11:       R ← FindReplacementBlock(LRU)
12:       evict R from Cache
13:       if evictionTime(R) > t then
14:         B_LRU = B_LRU + block size
15:       end if
16:     end if
17:     Load A into Cache
18:   end if
19:   evictionTime(A) ← t + Compute_Eviction_Time()

20: function Volume_Resize(Cache) {// Periodic}
21:   t ← current time
22:   I ← All blocks in Cache with evictionTime ≤ t
23:   evict all blocks in I
24:   B_evict = B_evict + |I| * block size
25:   S = S + ⌊(B_LRU − B_evict)/G⌋ * G
26:   B_LRU = B_evict = 0
27: 
28: function Compute_Eviction_Time()
29:   if Eviction Method is Deterministic then
30:     return T
31:   else {Probabilistic eviction method}
32:     r ← Random[0 : 1]
33:     return T log[(e − 1)r + 1]
34:   end if
```

METHOD AND APPARATUS FOR A FRUGAL CLOUD FILE SYSTEM

TECHNICAL FIELD

The invention relates generally to methods and apparatus for providing a file system in the cloud.

BACKGROUND

This section introduces aspects that may be helpful in facilitating a better understanding of the inventions. Accordingly, the statements of this section are to be read in this light and are not to be understood as admissions about what is in the prior art or what is not in the prior art.

In some known cloud file systems, cloud providers treat the different types of available storage devices in a similar way, even though some storage devices have differing associated costs and/or properties that make different storage devices better for certain operations than others. In some of these systems, the entire image of the file system is stored in at least two types of storage devices, while the operations are performed on the image stored on the higher performance storage device. In this scheme, there are charges for the higher performance storage device running the entire virtual machine instance as opposed to only using the higher performance storage device for the storage actually used in the virtual machine. As a result, loading the entire image of the file system into the higher performance storage device leads to larger storage and operating costs even though only a small fraction of the file system is actually used by the users.

SUMMARY

Various embodiments provide a method and apparatus of providing a frugal cloud file system that efficiently uses the blocks of different types of storage devices with different properties for different purposes. The efficient use of the different types of available storage devices reduces the storage and bandwidth overhead. Advantageously, the reduction in storage and bandwidth overhead achieved using the frugal cloud file system reduces the economic costs of running the file system while maintaining high performance.

In one embodiment, an apparatus is provided for providing a frugal cloud file system. The apparatus includes a data storage and a processor communicatively coupled to the data storage. The processor is programmed (e.g., configured to) to: maintain a first set of file block locations of at least a portion of the plurality of file image blocks that are located in a first storage system and a second set of file block locations of blocks that are located in a second disparate storage system. Furthermore, at least a portion of in-use file blocks corresponding to the second set of file block locations are maintained in the second disparate storage system based on eviction times corresponding to the portion of in-use blocks.

In some embodiments, the data storage includes an FCFS mapping table including a location pointer and a backup copy pointer. The backup copy pointer identifies locations of the plurality of file image blocks in the first storage system, and the location pointer identifies active locations of the plurality of file image blocks in either the first storage system or the second disparate storage system.

In some embodiments, the second disparate storage system has higher I/O efficiencies than the first storage system.

In some embodiments, the apparatus also includes an I/O interface communicatively coupled to the processor. In some of these embodiments, the processor is also programmed to receive a client file request via the I/O interface, and service the client file request based on the second set of file block locations.

In some embodiments, the client file request is a read request or a write request.

In some embodiments the client file request is a request to access at least one file block.

In some embodiments, the processor is also programmed to assign the accessed file block(s) to corresponding in-use block(s).

In some embodiments, the processor is also programmed to determine an eviction time of the in-use block(s) from the second disparate storage system based on a file access characteristic.

In some embodiments, the file access characteristic is a last block access time.

In some embodiments, the eviction time is further based on a cost optimization and/or the client file request type.

In some embodiments, the processor is also programmed to replace at least one in-use file block with at least one accessed file block based on a least recently used policy.

In some embodiments, the processor is also programmed to receive a plurality of client file requests via the I/O interface, and service the plurality of client file requests based on the second set of file block locations. In some of these embodiments, the client file requests include a portion of read requests and/or write requests.

In some embodiments, the processor is also programmed to allocate one or more read storage volumes in the second disparate storage system; allocate one or more write storage volumes in the second disparate storage system; assign substantially all of the plurality of requested read file blocks to the one or more read storage volumes; and assign substantially all of the plurality of received write file blocks to the one or more write storage volumes.

In some embodiments, the processor is also programmed to allocate a storage volume in the second disparate storage system; mark a portion of the requested read and/or write file blocks for deletion based on corresponding read/write eviction times; and resize the allocated storage volume based on the blocks that are marked for deletion.

In some embodiments, the processor is also programmed to determine a count of replaced file blocks over a resize interval based on the number of blocks replaced using a least recently used policy; and further base the resizing of the allocated storage volume on the count of replaced file blocks.

In a second embodiment, a frugal cloud file server system for storing a file image including a plurality of file image blocks Is provided. The system includes a first storage system, a second disparate storage system, and a frugal cloud file server. The frugal cloud file server is programmed to: maintain a first set of file block locations of at least a portion of the plurality of file image blocks that are located in a first storage system and a second set of file block locations of blocks that are located in a second disparate storage system; receive a number of client file requests; and service the client file requests based on the second set of file block locations. Furthermore, at least a portion of in-use file blocks corresponding to the second set of file block locations are maintained in the second disparate storage system based on eviction times corresponding to the portion of in-use blocks. Moreover, the client file requests include a portion of read requests and/or write requests.

In some embodiments, the frugal cloud file server is also programmed to allocate a storage volume in the second disparate storage system; mark a portion of the requested read and/or write file blocks for deletion based on corresponding read/write eviction times; and resize the allocated storage volume based on the blocks that are marked for deletion.

In a third embodiment, a method for handling a received file request in a frugal cloud file architecture is provided. The method includes maintaining a first set of file block locations of at least a portion of the plurality of file image blocks that are located in a first storage system and a second set of file block locations of blocks that are located in a second disparate storage system; receiving, a number of client file requests; and servicing the client file requests based on the second set of file block locations. Furthermore, at least a portion of in-use file blocks corresponding to the second set of file block locations are maintained in the second disparate storage system based on eviction times corresponding to the portion of in-use blocks. Moreover, the client file requests include a portion of read requests and/or write requests.

BRIEF DESCRIPTION OF THE DRAWINGS

Various embodiments are illustrated in the accompanying drawings, in which:

FIG. 7 depicts a flow chart illustrating an embodiment of a method for handling an I/O volume shrinkage event by the request decision engine program 229 of FIG. 2; and FIG. 8 illustrates an embodiment pseudo code for the programs 220 of FIG. 2 for handling block reads.

To facilitate understanding, identical reference numerals have been used to designate elements having substantially the same or similar structure and/or substantially the same or similar function.

Detailed Description of Illustrative Embodiments

Various embodiments provide a method and apparatus of providing a frugal cloud file system that efficiently uses the blocks of different types of storage devices with different properties for different purposes. The efficient use of the different types of available storage devices reduces the storage and bandwidth overhead. Advantageously, the reduction in storage and bandwidth overhead achieved using the frugal cloud file system reduces the economic costs of running the file system while maintaining high performance.

Figure 1:
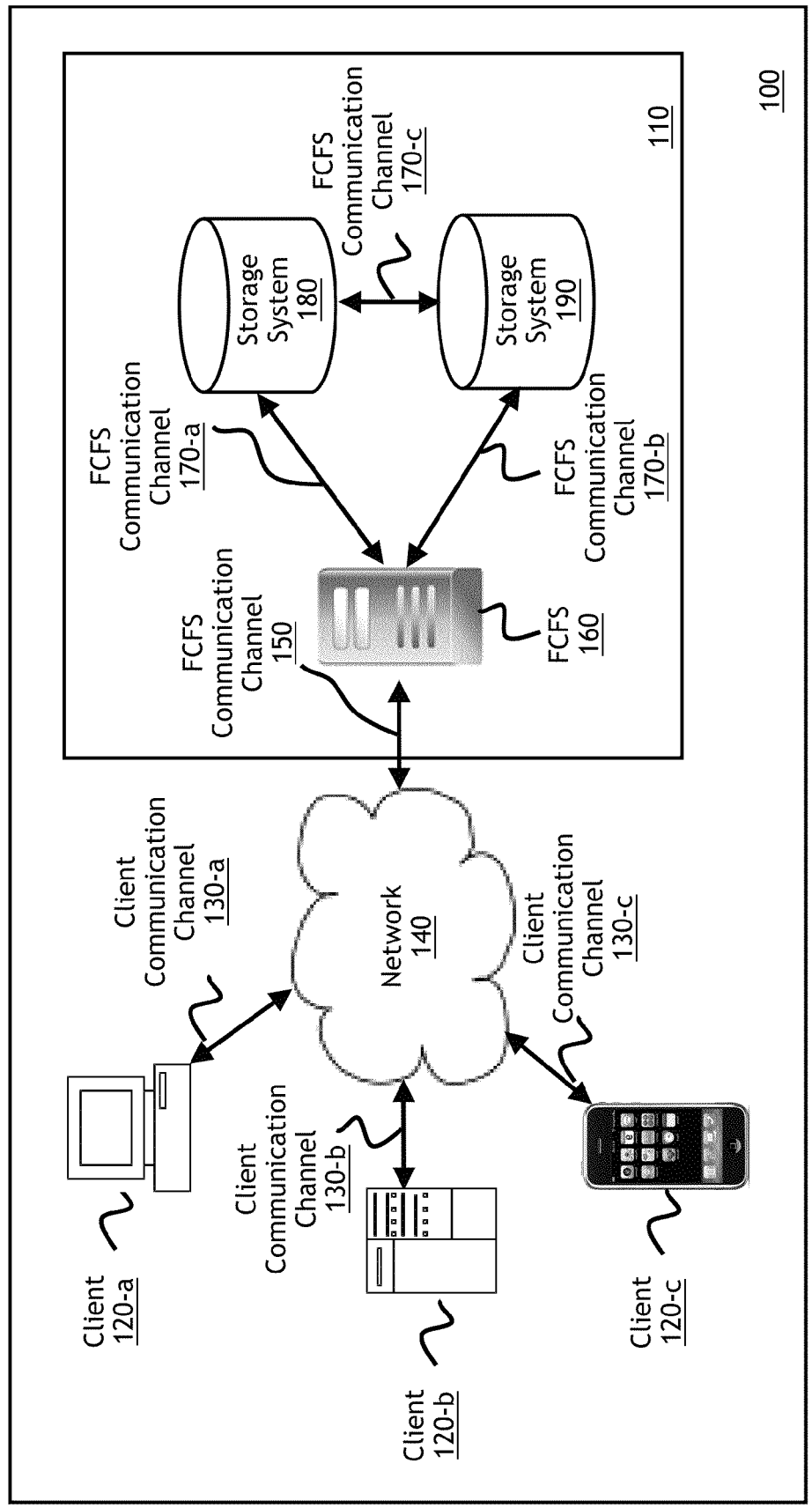
FIG. 1 illustrates a frugal cloud file network 100 that includes an embodiment of the frugal cloud file architecture 110.

FIG. 1 illustrates a frugal cloud file network 100 that includes an embodiment of the frugal cloud file architecture 110. The frugal cloud file network 100 includes one or more clients 120-*a*-120-*c* (collectively, clients 120) that send file requests to the frugal cloud file architecture 110 via a communication path. The communication path may include one of client communication channels 130-*a*, 130-*b*, and 130-*c* (collectively client communication channels 130), a network 140, and a frugal cloud file server (FCFS) communication channel 150. The frugal cloud file architecture 110 includes an FCFS 160 communicating with two or more disparate storage systems 180 and 190 over FCFS communications channels 170-*a* and/or 170-*b*. Optionally, disparate storage systems 180 and 190 may communicate directly with each other over FCFS communications channel 170-*c*.

The clients 120 may be any type or number of client machine(s) initiating file request(s) directed to the frugal cloud file architecture 110. For example, a client may be: a server, a mobile phone, a tablet, a computer, a personal digital assistant (PDA), an e-reader, a network device (e.g., a switch or a router) and/or the like.

The client communication channels 130 and FCFS communications channel 150 may support retrieving or responding to file requests over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); and the like. It should be appreciated that though depicted as a single connection, client communication channels 130 and FCFS communication channel 150 may be any number or combinations of communication channels supporting communication between clients 120 and the FCFS 160 over network 140.

The network 140 may be any suitable network for facilitating communication between clients 120 and the FCFS 160. For example, network 140 may be any combination of: Local Area Network(s) (LAN), Wireless Local Area Network(s) (WLAN), Wide Area Network (WAN), Metropolitan Area Network (MAN), and/or the like.

The FCFS 160 manages the allocation of storage devices required to handle received file requests from the clients 120. In particular, the FCFS 160 manages the allocation of storage from storage systems 180 and 190. The allocation of storage from storage systems 180 and 190 allows the I/O storage volume to grow and shrink dynamically depending on the I/O patterns, file system size and file access characteristics (e.g., last recent file access). Advantageously, since only a small fraction of the file system is typically accessed by the user (e.g., 10-20%), dynamically sizing the usage of storage systems 180 and 190 lowers cost while maintaining performance levels.

The FCFS communication channels 170 may support handling communications within the frugal cloud file architecture 110 over one or more communication channels such as: wireless communications (e.g., LTE, GSM, CDMA, bluetooth); femtocell communications (e.g., WiFi); packet network communications (e.g., IP); broadband communications (e.g., DOCSIS and DSL); storage communications (e.g., Fibre Channel, iSCSI) and the like. It should be appreciated that though depicted as a single connection, FCFS communication channels 170 may be any number or combinations of communication channels.

It should be appreciated that FCFS communication channels 170 may be over one or more networks (not shown). Such networks may be any suitable network for facilitating communication between any of FCFS 160, storage system 180 and storage system 190. For example, the network may be any combination of: Local Area Network(s) (LAN), Wireless Local Area Network(s) (WLAN), Wide Area Network (WAN), Metropolitan Area Network (MAN), Storage Area Network (SAN), Network Attached Storage (NAS) and/or the like.

The storage systems 180 and 190 offer two building blocks for storing data for clients 120. In particular, storage system 180 is a simple storage service aimed for archival and backup purposes while storage system 190 is aimed for the I/O intensive file operations. As such, the storage system 180 and 190 are selected such that storage system 180 has lower storage costs as compared to storage system 190 and storage system 190 has lower I/O costs than storage system 180. Advantageously, clients 120 that are moved to the cloud may efficiently use the available storage blocks of storage systems 180 and 190 to lower storage overhead and reduce operating costs.

As referred to herein, storage efficient storage systems refer to storage systems that are simple storage services aimed for archival and backup purposes such as storage system 180. Furthermore, as referred to herein, I/O efficient storage systems refer to storage systems that are aimed for the I/O intensive file operations such as storage system 190. It should be appreciated that in the context of the frugal cloud file architecture 110, the determination that a storage system is aimed for archival and backup purposes or I/O intensive file operations does not require meeting an operating threshold. Rather, the determination is based on a comparison between the two storage systems available to the frugal cloud file architecture 110. Furthermore, it should be appreciated that even if both systems have the same storage efficiencies (e.g., cost of storage or access speeds) or even if one storage systems has lower storage efficiencies, the storage system with the higher I/O efficiencies is the I/O efficient storage system.

In some embodiments, FCFS 160 allocation of storage is based on efficiently allocating different characteristics of the data blocks within storage systems 180 and 190. In particular, by performing most of the I/O operations on the building blocks within storage system 190 and storing only a select portion of the data in the storage system 190, the frugal cloud file architecture 110 leverages both the high performance characteristics of storage system 190 and the lower cost characteristics of storage system 180.

It should be appreciated that the FCFS 160 may copy between, write/store to or read from storage systems 180 and 190 by sending file messages to storage systems 180 and/or 190 over FCFS communication channels 170.

In one embodiment, frugal cloud file architecture 110 stores only the heavily accessed blocks in storage system 190, but the entire file system is stored in storage system 180. In this embodiment, FCFS 160 predominantly performs I/O operations on blocks in storage system 190. In a further embodiment, when allocated storage space on storage system 190 is filled up, the least recently accessed block is written back to storage system 180 to free storage space for more recently accessed blocks.

Advantageously, in experimental testing allocating storage system 190 to be 10% of the total file storage required, a cost savings of 90% was achieved. Moreover, despite the increased number of I/Os performed on storage system 180 compared to solutions using 100% allocation of size to storage system 190, the increase in the I/O cost of storage system 180 was negligible due to the fact that the significant temporal locality in the blocks accessed constrained most file access to the data in storage system 190.

In a further embodiment, the FCFS 160 maintains the required data in storage system 190 and stores the balance of the file image not in storage system 190 in storage system 180.

In some embodiments, of frugal cloud file architecture 110, a file system image is loaded into a storage efficient storage system (e.g., storage system 180), a virtual machine is created to run the FCFS 160 and the FCFS 160 allocates I/O efficient storage system (e.g., storage system 190) with a volume of size that's an initial volume size of the image size in the storage efficient storage system. FCFS 160 then continues to process the file requests from the clients 120. In some of these embodiments, the initial volume size is 10%.

In some embodiments, storage systems 180 and 190 are two storage systems in frugal cloud file architecture 110, frugal cloud file architecture 110 including three or more storage systems. In a further embodiment, a storage system 180 may include one or more of the three or more storage systems and storage system 190 may include one or more of the three or more storage systems.

In some embodiments, storage systems 180 and 190 may use Amazon's AWS service. In this embodiment, storage system 180 may be Amazon's simple storage service (S3) and storage system 190 may be Amazon's elastic block store (or EBS). In other embodiments, storage systems 180 and 190 may use other cloud provider's storage offerings. For example, providers such as Google, Microsoft, and Rackspace offer similar building blocks as Amazon's S3 and EBS storage services. It should be appreciated that the storage systems 180 and 190 may include any combination of data storage devices used to retain file data.

In some embodiments, storage systems 180 and 190 may use Microsoft's storage service and caching service. The caching service offers low latency at very high cost, while storage service offers low cost storage, but can have variable latency. In this embodiment, the Microsoft storage service is the storage system 180 and the Microsoft caching service is the storage system 190.

In some embodiments, storage systems 180 and/or 190 may include more than one device and/or service. For example, Storage system 180 may include some storage from Amazon's AWS S3 service, some storage from a Google offering and/or some storage from hard disks that are provided by one of clients 120.

Figure 2:
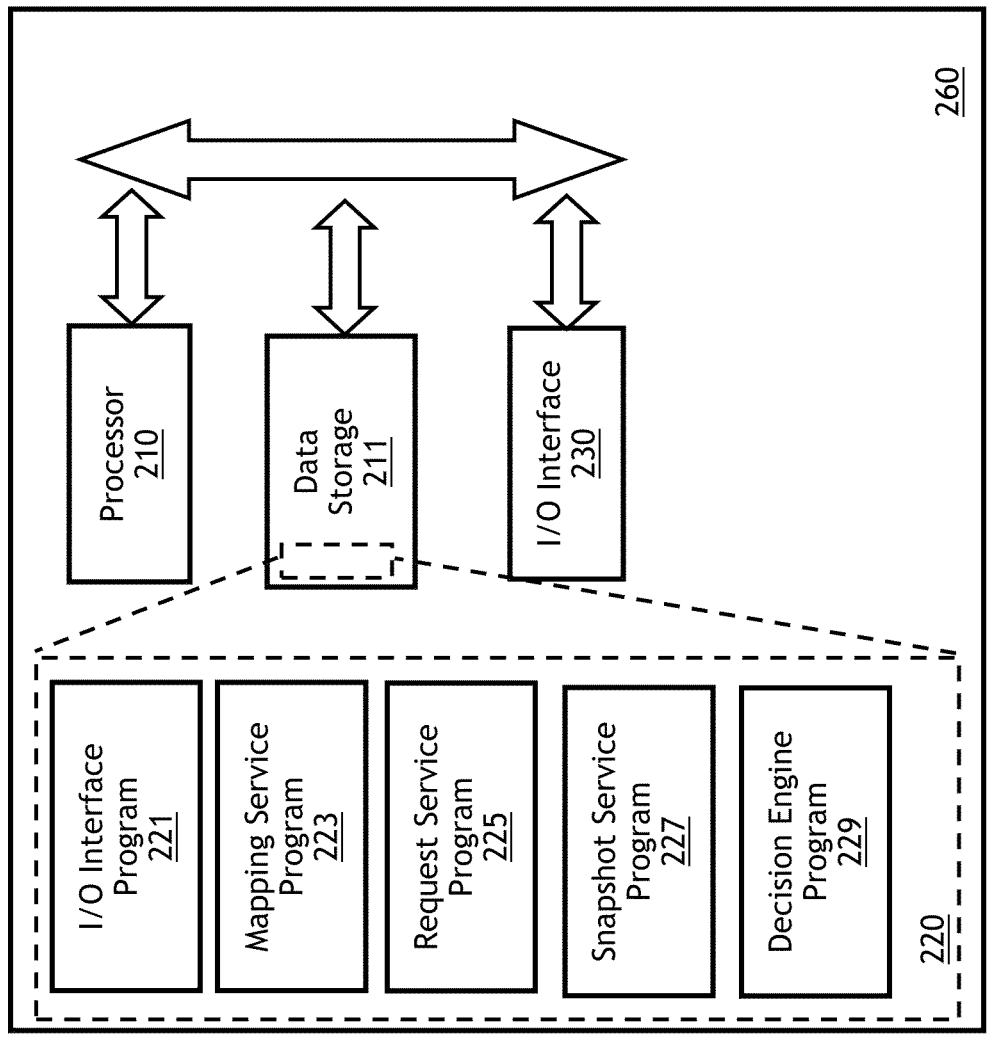
FIG. 2 illustrates an embodiment of the frugal cloud file server (FCFS) 110 of FIG. 1.

FIG. 2 schematically illustrates one embodiment of the FCFS 160 of FIG. 1. The FCFS 260 includes a processor 210, a data storage 211, and an I/O interface 230.

The processor 210 controls the operation of the FCFS 260. The processor 210 cooperates with the data storage 211.

Figure 3:
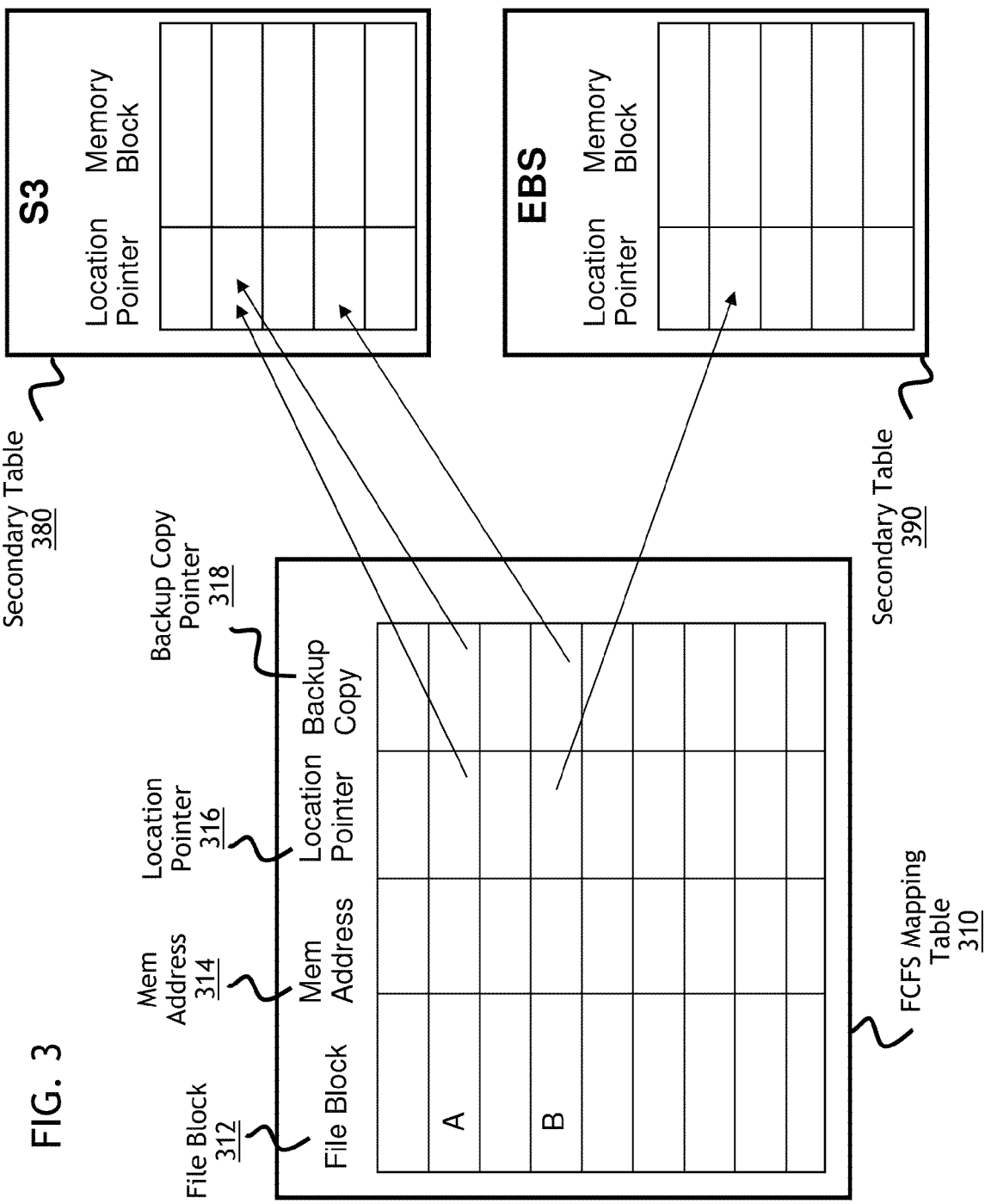
FIG. 3 depicts an embodiment of the storage mapping table 310 utilized by the mapping service program 223 of FIG. 2.

The data storage 211 may store the FCFS mapping table (FCFS mapping table 310 in FIG. 3). The data storage 211 also stores programs 220 executable by the processor 210.

The processor-executable programs 220 may include an I/O interface program 221, a mapping service program 223, a request service program 225, a snapshot service program 227 and/or a decision engine program 229. Processor 210 cooperates with processor-executable programs 220.

The I/O interface 230 cooperates with processor 210 and I/O interface program 221 to support communications over FCFS communications channel 150 of FIG. 1 and FCFS communication channels 170-a and 170-b of FIG. 1 as described above. It should be appreciated that FCFS 260 may communicate with the storage efficient storage system (e.g., storage system 180 of FIG. 1) via communication channel 170-a or via communication channel 170-b by sending communications through the I/O efficient storage system (e.g., storage system 190 of FIG. 1).

The mapping service program 223 maintains the allocation mapping used by FCFS 260 to point to which copy of data to use for file I/O operations. Referring to FIG. 3, FCFS mapping table 310 extends a conventional file system to include location pointer 316 and backup copy pointer 318 for each file block referenced by File Block 312. Location pointer 316 identifies the position of the last known reliable copy of the file. Backup copy pointer 318 identifies the position of the complete stored file. Optionally, the FCFS mapping table 310 also includes Mem Address 314. Mem Address 314 points to the memory block location.

It should be appreciated that in some embodiments, location pointer 316 and backup copy pointer 318 may store logical block numbers as opposed to actual physical block numbers of a storage volume. In some of these embodiments, secondary tables 380 and 390 may be created in storage systems 180 and 190 of FIG. 1 respectively. Secondary tables 380 and 390 map the logical block numbers identified by location pointer 316 and backup copy pointer 318 to the actual physical block numbers within the storage volumes of storage systems 380 and 390.

The request service program 225 receives and responses to file requests from clients 120 of FIG. 1. In some embodiments, the request service program 225 checks if the requested file block is in the I/O efficient storage system (e.g., storage system 190 of FIG. 1). If the requested block is not in the I/O efficient storage system, the data block is loaded from the storage efficient storage system (e.g., storage system 180 of FIG. 1) into the I/O efficient storage system. The client requested operation is then performed on the data blocks in the I/O efficient storage system.

The snapshot service program 227 pushes updates periodically from I/O efficient storage system 190 of FIG. 1 to storage efficient storage system 180 of FIG. 1. Advantageously, the snapshot service program 227 can potentially free space on storage system 190.

The decision engine program 229 determines the optimal size of one or more of the I/O efficient storage system volumes used as a supplement to the storage efficient storage system. The optimal size of the I/O efficient storage system is determined based on a number of parameters such as I/O patterns, file system size and file access characteristics (e.g., last recent file access). The optimal size is accomplished through I/O volume growth and shrinkage decisions.

In some embodiments, the FCFS 260 may be virtual machine. In some of these embodiments, the virtual machine may include components from different machines and/or be geographically dispersed. For example, the data storage 211 and the processor 210 may be in two different physical machines.

In some embodiments, an I/O volume growth decision is made when a new block needs to be brought into the I/O efficient storage system from the storage efficient storage system and the I/O efficient storage system falls below a threshold. For this I/O volume growth decision, the decision engine program 229 removes the least recently used block from the I/O efficient storage system. In a further embodiment, the decision engine program 229 checks if the block to be removed has been modified. If the block to be removed has been modified, the modified block is copied to the storage efficient storage system to bring the file system image up-to-date.

In some embodiments, when a threshold amount of recently-used blocks are evicted due to lack of space, the decision engine program 229 increases the volume size in the I/O efficient storage system automatically.

In some embodiments, an I/O volume shrinkage decision is made when the decision engine program 229 detects that a threshold number of blocks in I/O efficient storage system are unused or have not been accessed for a threshold amount of time.

In some embodiments, mapping service program 223 extends a virtual file system. In particular, the virtual file system includes a file name mapping table (not shown for clarity) where the file name points to a sequence of pointers to individual file blocks. In some of these embodiments, the virtual file system is the Linux Virtual File System and the file name mapping table is the Inode List Table. Referring to FIG. 3, each file block pointer in the file name mapping table will then point to an entry in this mapping table in FIG. 3 (e.g., File Block 312).

In some embodiments, mapping table 310 is replicated using conventional backup techniques to provide resiliency.

In some embodiments, FCFS mapping table 310 is extended to additional layers of persistent stores. For example, the persistent store of an ISP and of a private cloud where the persistent stores are used as I/O storage volumes. In these embodiments, the location pointer 316 and backup copy pointer 318 is capable of pointing to any place in the cloud (even a data block outside the machine or network or in a different cloud).

In some embodiments, the FCFS mapping table 310 further includes one or more of the following fields: a last access time field, an eviction time field, a dirty block flag field, and/or a deletion candidate flag field.

When processor-executable programs 220 are implemented on a processor 210, the program code segments combine with the processor to provide a unique device that operates analogously to specific logic circuits.

Figure 4:
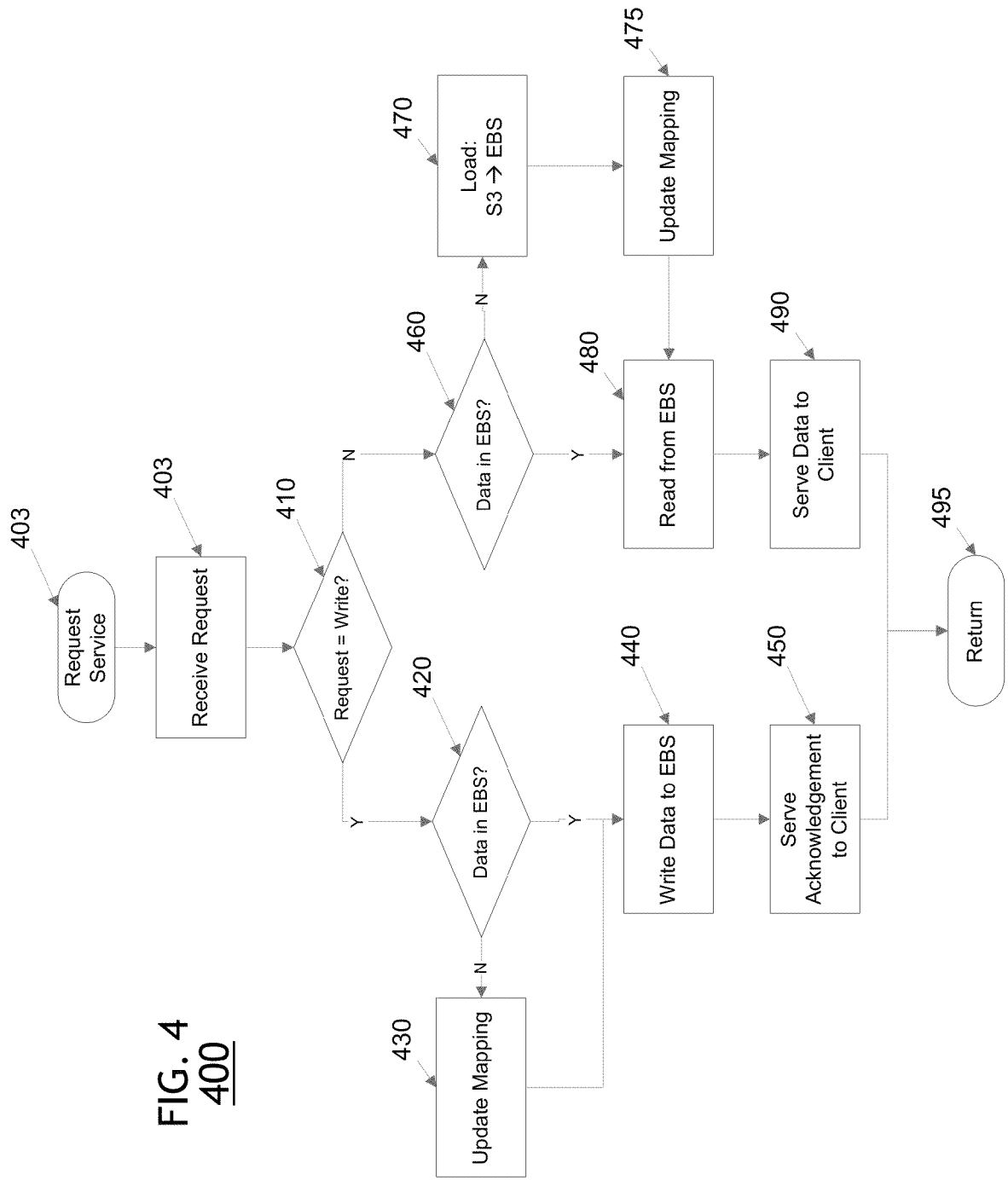
FIG. 4 depicts a flow chart illustrating an embodiment of a method for handling a file request by the request service program 225 of FIG. 2.

FIG. 4 depicts a flow chart illustrating an embodiment of a method 400 for handling a file request using the request service program 225 of FIG. 2.

In the method 400, the step 403 includes the FCFS (e.g., FCFS 260 of FIG. 2) receiving a file request from a client (e.g., client 120-a of FIG. 1) as described above in FIGS. 1-3.

In the method 400, the step 410 includes determining whether the client file request is a write request or a read request.

It should be appreciated that the client file request may be in any suitable format. In some embodiments, client file request may be formatted in a conventional format such as the Internet Small Computer System Interface (iSCSI) or Fibre Channel over IP (FCIP). In these embodiments, the client file request is in a conventional format and may be decoded using conventional methods to determine whether the file request is a read or a write request.

In the method 400, if it was determined in step 410 that the file request is a write request, then step 420 is performed.

In the method 400, the step 420 includes determining whether the received write file blocks are already in the I/O efficient storage system. In particular, the file name retrieved from the file request may be used as an index into the FCFS mapping table. For example, referring to FIG. 3, a file name retrieved from the file request may be used in a query of the FCFS mapping table 310 to select the row in the table where the retrieved file name matches the table file name 312. The location pointer 316 then may be used to determine whether the requested file blocks are already in the I/O efficient storage system.

In the method 400, if it was determined in step 420 that the received write file blocks are not in the I/O efficient storage system, the step 430 is performed. Step 430 includes updating the mapping table (e.g., FCFS mapping table 310) to point the I/O efficient storage system as containing the most recent version of the received write file blocks and then proceeding to step 440. Referring to FIG. 3, location pointer 316 is updated to point to the blocks of the I/O efficient storage system that are reserved to contain the received write file blocks. In some embodiments, the step 430 includes reserving storage in the I/O efficient storage system to store the received write file blocks.

In the method 400, upon completion of step 430 or if it was determined in step 420 that the received write file blocks are in the I/O efficient storage system, the step 440 is performed.

In the method 400, step 440 includes writing the received write file blocks to the I/O efficient storage system. In particular, the file blocks in the I/O efficient storage system are selected based on the FCFS mapping table. In some embodiments, if the FCFS mapping table has been updated (e.g., step 430), then the method may use the update information to select the file blocks to be written with the received file read blocks and does not need to make a separate query into the FCFS mapping table to locate the file blocks to be written.

The method 400 optionally includes step 450. Step 450 includes responding the client file request. In some embodiments, conventional file request protocols containing file acknowledgement messages are used.

In the method 400, if it was determined in step 410 that the file request is a read request, the step 460 is performed.

In the method 400, the step 460 includes determining whether the requested read file blocks are already in the I/O efficient storage system as described above in step 420.

In the method 400, if it was determined in step 460 that the requested read file blocks are not in the I/O efficient storage system, the step 470 is performed. Step 470 includes loading the requested file blocks from the storage efficient storage system to the I/O efficient storage system. Referring to FIG. 3, the location pointer (e.g., location pointer 316) in the FCFS mapping table (e.g., FCFS mapping table 310 in FIG. 3) is used to locate the requested read file blocks in the storage efficient storage system. The file blocks are then copied from the storage efficient storage system to the I/O efficient storage system. In some embodiments, the step 470 includes reserving storage in the I/O efficient storage system to store the copied file blocks.

In the method 400, step 475 includes updating the FCFS mapping table (e.g., FCFS mapping table 310) to point the I/O efficient storage system as containing the most recent version of the copied file blocks and then proceeding to step 480. Referring to FIG. 3, location pointer 316 is updated to point to the blocks of the I/O efficient storage system that are reserved to contain the copied data blocks.

In the method 400, upon completion of step 475 or if it was determined in step 460 that the data blocks are in the I/O efficient storage system, the step 480 is performed.

In the method 400, step 480 includes reading the requested read file blocks from the I/O efficient storage system. In particular, the file blocks in the I/O efficient storage system are selected based on the FCFS mapping table. In some embodiments, if the FCFS mapping table has been updated (e.g., step 475), then the method may use the update information to select the requested file read blocks and does not need to make a separate query into the FCFS mapping table to locate the requested read file blocks.

The method 400 optionally includes step 490. Step 490 includes serving the requested file data to the requesting client. In some embodiments, conventional file request protocols containing the requested read file blocks are used.

In some embodiments, the step(s) 430, 440, 470 and/or 475 optionally include triggering an I/O volume growth or I/O volume shrinkage event if the size of available blocks within the I/O efficient storage system falls below a growth threshold or rises above a shrinkage threshold. Available blocks within I/O efficient storage system may decrease due to the reservation of storage in steps 430 and/or 470/475. Additionally, in step 440, available blocks may decrease as a result of the write file request creating a larger file image than was previously stored in the I/O efficient storage system. Available blocks within I/O efficient storage system may increase as a result of the file write request (e.g., step 440) creating a smaller file image than was previously stored in the I/O efficient storage system.

In some embodiments of the method 400, step 450 and/or 490 includes the I/O efficient storage system responding directly to the requesting client (e.g., client 120-a in FIG. 1) without first going through the FCFS (e.g., FCFS 160 of FIG. 1). In a further embodiment, the I/O efficient storage system may send separate notification/status messages to the FCFS. Advantageously, responding directly to the requesting client may offload bandwidth and processing load from the FCFS. It should be appreciated that although in FIG. 1 a direct network connection between clients (e.g., clients 120) and the storage systems (e.g., storage systems 180 and 190) is not shown, they may be communicatively connected via any suitable network as described above.

In some embodiments of the method 400, steps 440 and/or 480 include setting a dirty block field in the FCFS mapping table entry corresponding to the received write file block and/or requested read file block.

In a first embodiment of the method 400, step 480 includes reading the requested read file blocks from the storage efficient storage system (e.g., coincident to reading the requested file blocks in step 470). In a second embodiment, step 480 includes reading the requested file blocks from the I/O efficient storage system. In a further embodiment of the second embodiment, the requested file blocks were loaded into the I/O efficient storage system during the act of loading in step 470. In a third embodiment of the method 400, step 480 may be optional. In a further embodiment of the third embodiment, the storage system (e.g., storage systems 180 and/or 190 of FIG. 1) serves the requested file blocks directly to the requesting client (e.g., client 120-a in FIG. 1) without first going through the FCFS (e.g., FCFS 160 of FIG. 1).

In some embodiments of the method 400, steps 440 and/or 480 include setting an eviction time field in the FCFS mapping table entry corresponding to the received write file block and/or requested read file block.

In some embodiments, the eviction time is based on a service level agreement. In particular, for applications that are sensitive to transaction delays, the eviction time may be set at a later time than for applications that are not sensitive to transaction delays. For example, for data applications that require minimal I/O transaction delays (e.g., financial transactions), the data blocks may have eviction times that never expire.

In some embodiments, the eviction time is based on a cost optimization of operational costs. In particular, a cost optimizer (not shown) may determine the eviction time based on the varying storage, I/O and bandwidth costs for storing and accessing data in the different storage systems (e.g., storage systems 180 and 190 of FIG. 1).

Referring to FIG. 1, in some embodiments of the cost optimizer, determining the eviction time includes optimizing whether the blocks are stored in the storage system 180 or both the storage system 180 and 190.

If the blocks are stored only in the storage system 180, the operational cost is based on the cost of fetching data from the storage system 180 and the cost of storing the blocks in the storage system 180. For example, to read a block of data from the storage system 180, the block is read from the storage system 180 to the storage system 190 and then the block is read from the storage system 190 to the FCFS 160. This incurs I/O and bandwidth costs over both FCFS communication channel 170-c and FCFS communication channel 170-b.

If the blocks are stored in both the storage systems 180 and 190, the operational cost is based on the cost of fetching data from the storage system 190 and the cost of storing the blocks in both the storage systems 180 and 190. For example, to read a block of data from the storage system 190, the block is read from the storage system 190 to the FCFS 160. This incurs I/O and bandwidth costs over both FCFS communication channel 170-b.

In some of these embodiments, the determined eviction time for a block from the storage system 190 is based on an eviction policy that attempts to minimize the overall operational cost. It should be appreciated that blocks stored in storage system 190 incur an additional storage cost (i.e., they are stored in storage system 190 as well as storage system 180) and that blocks not stored in storage system 190 incur additional block fetch costs (i.e., they incur the I/O and bandwidth costs associated with reading blocks from the storage system 180 to the storage system 190).

In a further embodiment, the eviction time is based on a time $Time_{Crossover}$. Where $Time_{Crossover}$ represents the crossover time when the optimal operation cost shifts from storing the blocks in both storage systems 180 and 190 and storing the blocks only in storage system 180. Let $storage_{180}$ and $storage_{190}$ represent the cost in dollars per hour to store a block of data in storage systems 180 and 190 respectively. Furthermore, let $fetch_{180}$ and $fetch_{190}$ represent the cost in dollars to fetch a block of data from storage systems 180 and 190 respectively. Finally, let $Time_{NextAccess}$ represent the time in hours between a first file operation and a second file operation on the same block of data. As such, the cost of fetching a block of data from storage system 180 is:

$$\text{cost} = Time_{NextAccess} * (storage_{180}) + fetch_{180} + fetch_{190} \quad (1)$$

Similarly, the cost of fetching a block of data from storage system 190 is:

$$\text{cost} = Time_{NextAccess} * (storage_{180} + storage_{190}) + fetch_{190} \quad (2)$$

Using equations (1) and (2), the time $Time_{Crossover}$ is $fetch_{180}/storage_{190}$. For example, if the operational costs are: $storage_{180}=\$4/hr$, $storage_{190}=\$8/hr$, $fetch_{180}=\$24$ and $fetch_{190}=\$16$, then $Time_{Crossover}=3$ hours.

In a first embodiment of an eviction policy, a deterministic scheme uses a time threshold ($Time_{Threshold}$) to determine the eviction time. In this embodiment, when a block is accessed from either of storage systems 180 or 190, the block is stored in storage system 190 for the time threshold units from the last file request (e.g., read or write) for that block. For example, in some embodiments, each time the block is accessed for either a read or a write, the eviction time is updated to be: $Time_{BlockRequest}+Time_{Threshold}$. Where $Time_{BlockRequest}$ is the time of receipt of the packet request. It should be appreciated that the $Time_{BlockRequest}$ may be any suitable anchor point such as, the time the request is received (e.g., step 403 in FIG. 4), the time the read or write occurred (e.g., steps 440 and 480 in FIG. 4), and/or the time the request was services (e.g., steps 450 and 490 in FIG. 4). In this embodiment, if the block has not been accessed $Time_{Threshold}$ units since the last file request for that block, the block is evicted from storage system 190.

In a second embodiment of an eviction policy, a probabilistic scheme evicts blocks from storage system 190 before the expiration of $Time_{Threshold}$. In some of these embodiments, the block eviction time is based on a probability density function p(t) that describes the probability of discarding a block from storage system 190 at time t (i.e., $Time_{Probilisitichreshold}) \in [0, Time_{Threshold}]$ from the last access time of the block. The block is evicted after $Time_{Probilisitichreshold}$ has elapsed with no subsequent access to this block.

In some embodiments, the probability density function used to determine $Time_{Probilisitichreshold}$ includes:
I. computing $Time_{Threshold}$ for the block,
II. generating RandomVariable which is a uniformly distributed random variable in the range [0:1], and
III. generating the block eviction time as:

$$Time_{Threshold} \log[(e-1)\text{RandomVariable}+1]. \quad (3)$$

In some embodiments of the first and second embodiments of eviction policies, $Time_{Threshold}$ is equal to $Time_{Crossover}$.

Figure 5:
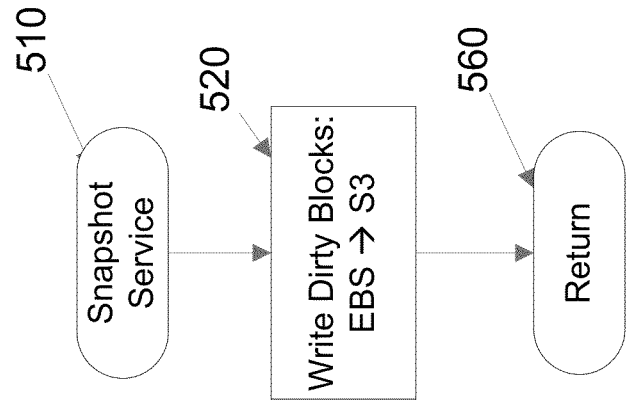
FIG. 5 depicts a flow chart illustrating an embodiment of a method for handling a snapshot request by the snapshot service program 227 of FIG. 2.

FIG. 5 depicts a flow chart illustrating an embodiment of a method 500 for handling a snapshot service event using the snapshot service program 227 of FIG. 2.

In the method 500, the step 520 includes writing dirty blocks from the I/O efficient storage systems to the storage efficient storage system. As described herein, a dirty block is defined as a block in the I/O efficient storage system that has been modified from the corresponding block in the storage efficient storage system. For example, a block in the I/O efficient storage system that has been modified by a write request no longer matches the blocks in the storage efficient storage system and is thus, a dirty block.

In a first embodiment of the method 500, dirty blocks are not written back to storage efficient storage system in response to the modification of the block. In this embodiment, modified blocks are marked to indicate that they have been modified. In some of these embodiments, the method 500 further includes modifying the marking on the blocks that have been copied to indicate that they are no longer dirty blocks. In some of these embodiments, each record in the mapping table (e.g., FCFS mapping table 310 in FIG. 3) has a marking field (e.g., a bit flag) that indicates whether the block (e.g., represented by file name 312 of FIG. 3) is a dirty block.

In some embodiments of this first embodiment, the execution of the method 500 is triggered by the FCFS (e.g., FCFS 160 of FIG. 1). The method 500 may be triggered by any suitable event such as: (a) periodically triggered at threshold intervals (e.g., every hour); (b) upon I/O volume shrinkage events; and/or (c) upon I/O volume growth events. It should be appreciated that some trigger events may occur at the same time.

In some embodiments of the method 500, the file blocks remain in the I/O efficient storage during a snapshot operation. For example, if the file blocks are being accessed frequently, they remain in the I/O efficient storage.

In some embodiments of the method 500, the threshold interval for triggering the method 500 dynamically changes based on changes to the I/O efficient storage system volume size. For example, if the volume size of the I/O efficient storage system grows or shrinks more than a threshold count within a period of time, the time threshold for triggering the method 500 may be reduced.

In some embodiments of the method 500, only those dirty blocks within the I/O efficient storage system that have been written completely are written back to the storage efficient storage system. In particular, if a file requesting write access has not closed its write file descriptor, then its blocks, while dirty, are not 'written completely'. Thus, in this embodiment, the method 500 only supports 'open-to-close' semantics, wherein any other user only sees the last version of the file that was closed properly.

The decision engine program 229 of FIG. 2 determines a preferred size of the available volumes in the I/O efficient storage system. In particular, while most of the file system blocks are stored in the storage efficient storage system, files that are accessed for reads or writes are fetched into the I/O efficient storage system. The preferred size of the I/O efficient storage system volume can grow or shrink over time based upon events such as client file requests and timer events. Client file requests and timer events may trigger I/O volume growth and I/O volume shrinkage events that may adjust the preferred size of the I/O efficient storage system based on I/O patterns, file system size and file access characteristics. The term "preferred size" as used herein should be understood broadly as including approximations that are based on any allocation sizing policy that attempts to dynamically allocate available volumes based on I/O patterns, file system size and file access characteristics.

In some embodiments, substantially all of the file system blocks that are accessed for reads or writes are stored in the I/O efficient storage as well as the storage efficient storage. The term "substantially all of the file system blocks that are access for reads or writes" as used herein should be understood broadly as including a ratio of accessed blocks stored in I/O efficient storage over stored blocks that is greater than 95% and that ratio resulting from a decision engine program policy that stores file system blocks in I/O efficient storage based on the block being accessed for reads and/or writes.

In some embodiments, the decision engine program 229 of FIG. 2 determines a block size for the available volumes. It should be appreciated that block sizes may be different for different volumes. It should also be appreciated that choosing a block size navigates the tradeoff between larger blocks reducing the I/O cost due to coalescing of writes, but increases the storage cost in the I/O efficient storage system and storage efficient storage system (e.g., storage systems 180 and 190 in FIG. 1). In some embodiments, a block size of 4 KB is used.

Figure 6:
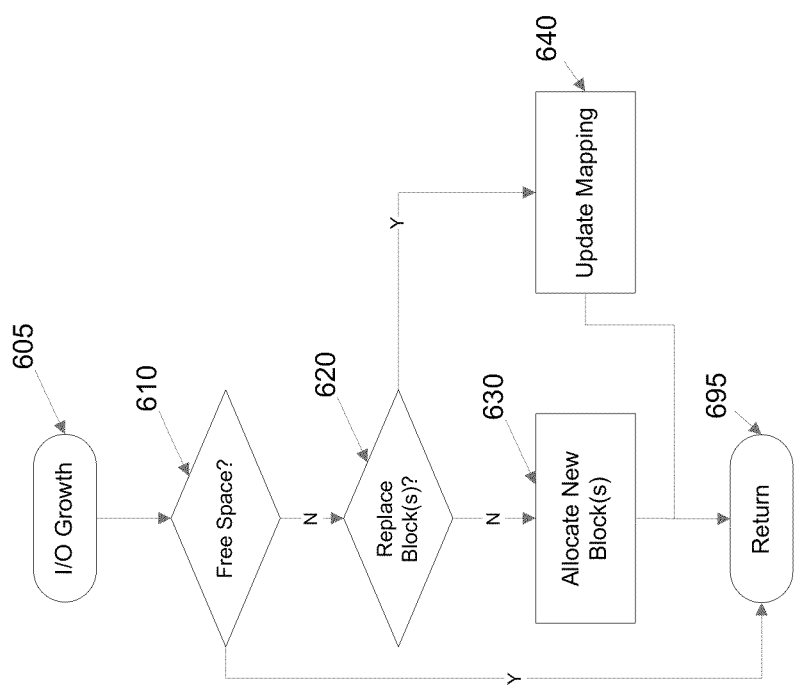
FIG. 6 depicts a flow chart illustrating an embodiment of a method for handling an I/O volume growth event by the decision engine program 229 of FIG. 2.

FIG. 6 depicts a flow chart illustrating an embodiment of a method 600 for handling an I/O volume growth event using the decision engine program 229 of FIG. 2.

In the method 600, step 610 includes determining whether there are sufficient free blocks in the I/O efficient storage system to handle the new blocks required to service the request. In particular, the I/O efficient storage system has an allocated storage size that is larger than the size of the blocks stored within it (i.e., an in-use storage size). The difference between the allocated storage size and the in-use storage size is the size of the unused portion of allocated storage (i.e., free storage size). If as shown in pseudo code (4) the free storage size is insufficient to handle the new blocks required to service the request, then there is not enough free storage allocated. In some embodiments, the buffer threshold size may be 0. It should be appreciated that any suitable algorithm may be used and pseudo code line (4) is a non-limiting example.

(new blocks+buffer threshold size)>free storage size  (4)

In the method 600, if it was determined in step 610 that sufficient free storage exists to address the growth request, the method ends and returns to the calling routine.

In the method 600, if it was determined in step 610 that sufficient free storage does not exist to address the growth request, the method proceeds to step 620.

The method 600 optionally includes step 620. Step 620 includes determining whether replacement blocks are available. In particular, replacement blocks are blocks that are only subject to read accesses and have not been read in the past replacement block threshold interval. In some embodiments, the replacement blocks are subject to replacement based on an least recently used (LRU) policy. If replacement blocks are available, the method proceeds to step 640. Else the method proceeds to step 630.

In the method 600, step 630 includes increasing the allocated storage size of the I/O efficient storage system. In particular, the allocated storage size is increased by a step growth size. It should be appreciated that the step growth size may be a fixed value or a determined value. Furthermore, it should be appreciated that the step growth size may be determined based on the current I/O efficient storage system and/or storage efficient storage system size (e.g., determined to be a fraction of the current I/O efficient storage system).

In the method 600, step 640 includes updating the FCFS mapping table (e.g., FCFS mapping table 310). In particular, referring to FIG. 3, the location pointers 316 are updated to point to the new blocks. In some embodiments, the location pointers 316 pointing to the replacement blocks, if any, are updated to point to the new blocks and/or to indicate a free block (e.g., more replacement blocks were released than were needed for the new blocks). In some embodiments, the step 640 further includes freeing the file storage that contained the replaced blocks in the I/O efficient storage system (e.g., the replacement blocks identified in step 620).

In some embodiments of the step 630, the step growth size is based on a historical analysis of the FCFS (e.g., FCFS 160 of FIG. 1). For example, a history of how many growth or shrinkage events changed the allocated storage size over a period of time. It should be appreciated that frequent changes may indicate an inadequate step growth size.

In some embodiments of the step 630, a new I/O efficient storage system volume that is step growth size bytes large is created and used as an additional I/O efficient storage system volume for storing newer blocks.

In some embodiments of the method 600, steps 620 and/or 640 include incrementing a counter, $Block_{LRU}$, for each block replaced due to a least recently used policy. It should be appreciated that replacing blocks before their eviction time may assist in characterizing the inefficiency of the system.

In some embodiments of the steps 630, and/or 640, the mapping service program (e.g., mapping service program 223 of FIG. 2) manages the allocation of allocated I/O efficient storage system storage and/or updates the FCFS mapping table (e.g., FCFS mapping table 310 of FIG. 3).

In some embodiments, the I/O efficient storage system is initialized to 10% of the size of the file images stored in the storage efficient storage system.

FIG. 7 depicts a flow chart illustrating an embodiment of a method 700 for handling an I/O volume shrinkage event using the decision engine program 229 of FIG. 2.

In the method 700, step 710 includes determining whether there are candidate blocks for shrinkage. In particular, the FCFS mapping table is checked to track those blocks in the I/O efficient storage system that have not been accessed for an inactivity interval.

In the method 700 at step 720, if it was determined in step 710 that there are candidate blocks for shrinkage and the optional step 730 is performed, the method proceeds to step 730, else the method proceeds to step 760.

The method 700 optionally includes step 730. Step 730 includes marking the determined candidate blocks for deletion. If the optional step 740 is not performed, the method proceeds to step 760. In some embodiments, the FCFS mapping table deletion candidate flag field is set.

The method 700 optionally includes steps 740 and 750. Step 740 includes determining if the file block is a dirty block. If the file block is dirty, step 750 marks the block as dirty to indicate it is ready to be synced with the storage efficient storage system. In some embodiments, the FCFS mapping table deletion candidate flag field is set.

In the method 700, step 760 includes determining the size of blocks marked for deletion. In step 770, if the count of deletion candidate blocks exceeds a shrink threshold block count value (expressed either in absolute size or in relative terms as a fraction of EBS volume size, preferably the former), then the method proceeds to step 780, else the method returns.

In the method 700, step 780 includes copying the dirty blocks to the storage efficient storage system. In particular, dirty blocks that are marked for deletion need to be copied to the storage efficient storage system before being deleted.

In the method 700, step 790 includes resizing the I/O efficient storage system volume. In particular, if it is determined that the I/O efficient storage system volume is not of a preferred size, the volume is resized.

In some embodiments of the step 710, the FCFS mapping table includes an eviction time field. In these embodiments, the determination that a block is a candidate for shrinkage will be based on the value of the eviction time field and the current time.

In some embodiments of the step 760, a counter may be incremented for each block marked for deletion and decremented each time a block has been deleted or its deletion candidate flag has been cleared. For example, a block marked in step 730 will increment the counter, a block read or written to in step(s) 450 or 490 of FIG. 4 may decrement the counter if the deletion candidate flag has been cleared and/or all of the blocks that have been deleted in a volume resize shrinkage event will decrement the counter by the total block size.

In some embodiments of the step 760 (e.g., when steps 730, 740 and 750 are not performed), the marked blocks may be determined by using the FCFS mapping table eviction time field as the mark. In this embodiment, an expired eviction time field indicates a deletion candidate block.

In some embodiments of the step 780, the step includes triggering the snap shot service (e.g., snapshot service program 227 of FIG. 2).

In some embodiments of the step 790, the step includes incrementing a counter, $B_{evict}$, for each evicted block.

In some embodiments of the step 790, the step includes marking the I/O efficient storage system volume for shrinkage. In some of these embodiments, volume resizing may occur at periodic intervals by calling a volume resize routine. In some of these embodiments, step 780 may be performed during periodic intervals outside of the I/O shrink program as well. In some of these embodiments, step 780 may be performed during the call to the volume resize routine.

In some embodiments of the step 790, the step includes reducing the I/O efficient storage system volume to the nearest allocation multiple. For example, with the shrink threshold block count value (S_shrink) set to 2 GB and nearest allocation multiple (S_alloc) set to 1 GB, let the marked up file sizes total 4.2 GB. Then the file system is reduced in size by 4 GB.

In some embodiments of the method 700, a timer event in the FCFS (e.g., the FCFS 160 of FIG. 1) periodically triggers the method 700. The selection of I/O shrink timer event determines how aggressive the shrinking will be. For example, a I/O shrink timer value of 24 hours may be used for an aggressive system and an I/O shrink timer value of 15 minutes may be used for a relaxed system.

Referring to FIGS. 2-7, in some embodiments of the FCFS 260 of FIG. 2, the FCFS 260 may include a volume resizing program (not shown).

The execution of the volume resizing program may be triggered by the FCFS (e.g., FCFS 260 of FIG. 2). The volume resizing program may be triggered by any suitable event such as: (a) periodically triggered at threshold intervals (e.g., every hour); (b) upon I/O volume shrinkage events (e.g., step 790 of FIG. 7); and/or (c) upon I/O volume growth events (e.g., steps 630 and/or 650 of FIG. 6). It should be appreciated that some trigger events may occur at the same time.

The ideal size of the I/O efficient storage system volume is the minimum the I/O efficient storage system volume needed to host the working set of data from the file system. Ideally, no blocks should be evicted from the I/O efficient storage system volume because there was no space (via LRU) in the volume. In this ideal system, blocks are only evicted based on cost optimizations.

In some embodiments, the size of the I/O efficient storage system volume(s) dynamically resize at periodic intervals. In a further embodiment, the size of a I/O efficient storage system volume ($Volume_{Size}$) changes based on how many blocks have been replaced (e.g., $Block_{LRU}$) in the volume before their eviction time during the last resize interval. It should be appreciated that $Block_{LRU}$ may be used to characterize the level of inadequacy of the current I/O efficient storage system volume size. In the same interval, let the number of blocks that have been evicted by FCFS add up to $Block_{evict}$. This indicates the size of the I/O efficient storage system volume that is no longer needed to hold the blocks. Therefore, at the next re-sizing event, we set the new cache volume size to be: $Volume_{Size} + Block_{LRU} - Block_{evict}$.

In some of these embodiments, the periodic resizing intervals may be set to a static threshold. For example, a volume size increase interval may be every 4 minutes, and a volume size decrease interval may be every hour. It should be appreciated that allocating or deallocating a volume involves moving blocks around, which can cause a lot of overhead if done frequently. Advantageously, having a larger time interval for decreasing the volume size may avoid frequent fluctuations in the size, thus making the volume size more stable.

In some of these embodiments, there are practical restrictions on the granularity of the size of the I/O efficient storage system volume. For example, in Amazon, the minimum increment/decrement size for the EBS is 1 GB. In these embodiments, we round the volume increase or decrease to the nearest multiple of the minimum increment/decrement size (e.g., 1 GB).

In some embodiments, separate read and write $Time_{Threshold}$ thresholds are used to set the block eviction time. For example, a block eviction time may be set during a read or write operation (e.g., steps 430 and 475 in FIG. 4) and stored in the FCFS mapping table. Advantageously, if the cloud storage service charges differently for writes and reads, then the cost optimizer may determine the eviction time thresholds for the read and write blocks based on the different read and write fetch costs.

In some embodiments, separate read and write I/O efficient storage system volumes are allocated. For example, block eviction times may be determined during the I/O volume shrinkage event (e.g., step 710 of FIG. 7). Advantageously, if the cloud storage service charges differently for writes and reads, then the cost optimizer may determine the eviction time thresholds for the read and write volumes based on the different read and write fetch costs.

FIG. 8 illustrates an embodiment pseudo code for the programs 220 of FIG. 2 for handling block reads. The code for block writes may be similar, with additional code to track dirty blocks, write back dirty blocks upon eviction, and periodic checkpointing of dirty blocks.

In the pseudo code, we use:
  i. G to represent the granularity of resizing the volume,
  ii. Cache to represent an I/O efficient storage system volume,
  iii. $B_{LRU}$ to represent $Block_{LRU}$,
  iv. $B_{Evict}$ to represent $Block_{Evict}$,
  v. T to represent $Time_{Threshold}$,
  vi. $f_d$ to represent $fetch_{180}$, and
  vii. $m_c$ to represent $storage_{190}$.

In line (2), the program variables are initialized. In lines (4)-(19), Access_Block is called to respond read requests. In lines (21)-(27), Volume Resize is called periodically to resize the Cache. In lines (29)-(35) Compute_Eviction_Time is called to decide the eviction time of a block upon access.

It should be appreciated that in the Volume_Resize routine, if $B_{LRU} \geq B_{evict}$ then $B_{LRU} - B_{evict}$ represents the amount by which the cache size has to be increased. If $B_{LRU} < B_{evict}$ then $B_{LRU} - B_{evict}$ represents the amount by which the cache size has to be decreased Although primarily depicted and described in a particular sequence, it should be appreciated that the steps shown in methods 400, 500, 600 and 700 may be performed in any suitable sequence. Moreover, the steps identified by one step may also be performed in one or more other steps in the sequence and/or common actions of more than one step may be performed only once.

For example, steps 420 and 460 in FIG. 4 may be performed by the same program code. Furthermore, the act of reading the requested file blocks in steps 470 and 480 in FIG. 4 may both be satisfied by the same read operation.

It should be appreciated that steps of various above-described methods can be performed by programmed computers. Herein, some embodiments are also intended to cover program storage devices, e.g., data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable data storage media. The embodiments are also intended to cover computers programmed to perform said steps of the above-described methods.

Although depicted and described herein with respect to embodiments in which, for example, programs and logic are stored within the data storage and the memory is communicatively connected to the processor, it should be appreciated that such information may be stored in any other suitable manner (e.g., using any suitable number of memories, storages or databases); using any suitable arrangement of memories, storages or databases communicatively coupled to any suitable arrangement of devices; storing information in any suitable combination of memory(s), storage(s) and/or internal or external database(s); or using any suitable number of accessible external memories, storages or databases. As such, the term data storage referred to herein is meant to encompass all suitable combinations of memory(s), storage(s), and database(s).

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The functions of the various elements shown in the FIGs., including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non volatile storage. Other hardware, conventional and/or custom, may also be included. Similarly, any switches shown in the FIGS. are conceptual only. Their function may be carried out through the operation of program logic, through dedicated logic, through the interaction of program control and dedicated logic, or even manually, the particular technique being selectable by the implementer as more specifically understood from the context.

It should be appreciated that any block diagrams herein represent conceptual views of illustrative circuitry embodying the principles of the invention. Similarly, it should be appreciated that any flow charts, flow diagrams, state transition diagrams, pseudo code, and the like represent various processes which may be substantially represented in computer readable medium and so executed by a computer or processor, whether or not such computer or processor is explicitly shown.

What is claimed is:

1. A file server apparatus including a plurality of disparate storage systems for storing a file image including a plurality of file image blocks, the apparatus comprising:
  a data storage; and
  a processor communicatively coupled to the data storage, the processor configured to:
  maintain, in the data storage, a first set of file block locations of at least a first portion of the plurality of file image blocks that are located in a first storage system of the plurality of disparate storage systems; and
  maintain, in the data storage, a second set of file block locations of at least a second portion of the plurality of file image blocks that are located in a second disparate storage system of the plurality of disparate storage systems;
  wherein at least a plurality of in-use file blocks corresponding to the second set of file block locations are maintained in the second disparate storage system based on a plurality of eviction times that are corresponding to the plurality of in-use blocks and based on a cost optimization; and
  wherein the cost optimization is based on a first data access monetary cost and a first data storage monetary cost associated with fetching at least a portion of the plurality of in-use file blocks from the first storage system and a second data access monetary cost and a second data storage monetary cost associated with fetching at least a portion of the plurality of in-use file blocks from the second storage system.

2. The apparatus of claim 1,
wherein the data storage comprises a mapping table, the mapping table comprising a location pointer and a backup copy pointer;
wherein the backup copy pointer identifies locations of the plurality of file image blocks in the first storage system; and
wherein the location pointer identifies active locations of the plurality of file image blocks in either the first storage system or the second disparate storage system.

3. The apparatus of claim 1, wherein the second disparate storage system has a lower data access speed than the first storage system.

4. The apparatus of claim 1, wherein the apparatus further comprises:
an I/O interface communicatively coupled to the processor; and
wherein the processor is further configured to:
receive a client file request via the I/O interface; and
service the client file request based on the second set of file block locations.

5. The apparatus of claim 4, wherein the client file request comprises at least one of a read request type and a write request type.

6. The apparatus of claim 5, wherein the client file request comprises a request to access at least one file block.

7. The apparatus of claim 6, wherein the processor is further configured to assign the at least one file block to a corresponding at least one in-use block of the plurality of in-use blocks.

8. The apparatus of claim 6, the processor is further configured to:
replace at least one in-use file block of the plurality of in-use blocks with the at least one file block based on a least recently used policy.

9. The apparatus of claim 1, wherein the processor is further configured to determine an eviction time of the at least one in-use block from the second disparate storage system based on a file access characteristic.

10. The apparatus of claim 9, wherein the file access characteristic is a last block access time.

11. The apparatus of claim 1, wherein the eviction time is further based on the client file request type.

12. The apparatus of claim 1, wherein the apparatus further comprises:
an I/O interface communicatively coupled to the processor; and
wherein the processor is further configured to:
receive a plurality of client file requests via the I/O interface; and
service the plurality of client file requests based on the second set of file block locations;
wherein the plurality of client file requests comprises at least one of:
a first portion of the plurality of client file requests being read requests to read a plurality of requested read file blocks corresponding to the first portion of the plurality of client file requests; and
a second portion of the plurality of client file requests being write requests to write a plurality of received write file blocks corresponding to the second portion of the plurality of client file requests.

13. The apparatus of claim 12, wherein the processor is further configured to:
allocate one or more read storage volumes in the second disparate storage system;
allocate one or more write storage volumes in the second disparate storage system;
assign substantially all of the plurality of requested read file blocks to the one or more read storage volumes; and
assign substantially all of the plurality of received write file blocks to the one or more write storage volumes.

14. The apparatus of claim 12, wherein the processor is further configured to:
allocate a storage volume in the second disparate storage system;
perform at least one of:
mark a plurality of the plurality of requested read file blocks for deletion based on a plurality of read eviction times corresponding to the plurality of requested read file blocks; and
mark a plurality of the plurality of received write file blocks for deletion based on a plurality of write eviction times corresponding to the plurality of requested write file blocks; and
resize the allocated storage volume based on the plurality of requested read file blocks and the plurality of received write file blocks that are marked for deletion.

15. The apparatus of claim 14, wherein the processor is further configured to perform at least one of:
replace a first plurality of the second set of file blocks in the second disparate storage system with a corresponding plurality of the plurality of requested read file blocks based on a least recently used policy; and
replace a second plurality of the second set of file blocks in the second disparate storage system with a corresponding plurality of the plurality of received write file blocks based on the least recently used policy.

16. The apparatus of claim 15, wherein the processor is further configured to:
determine a count of replaced file blocks over a resize interval based on the replaced first and second plurality of the second set of file blocks; and
further base the resizing of the allocated storage volume on the count of replaced file blocks.

17. The apparatus of claim 1, wherein the apparatus further comprises:
an I/O interface communicatively coupled to the processor; and
wherein the processor is further configured to:
receive a first client file request via the I/O interface, the first client file request comprising a request to write at least one first received write file block;
based on a condition in which the first client file request is a write request and the at least one first received write file block is in the second disparate storage based on the second set of file block locations:
write the at least one first received write file block to a first in-use block location based on the second set of file block locations;
receive a second client file request via the I/O interface, the second client file request comprising a request to write at least one second received write file block;
based on a condition in which the second client file request is a write request and the at least one second received write file block is not in the second disparate storage based on the second set of file block locations:
update the second set of file block locations to include the one second received write file block; and write the at least one second received write file block to a second in-use block location based on the second set of file block locations;

receive a third client file request via the I/O interface, the third client file request comprising a request to read at least one third requested read file block;

based on a condition in which the third client file request is a read request and the at least one third requested read file block is in the second disparate storage based on the second set of file block locations:

read the at least one third requested read file block from a third in-use block location based on the second set of file block locations;

receive a fourth client file request via the I/O interface, the fourth client file request comprising a request to read at least one fourth requested read file block;

based on a condition in which the fourth client file request is a read request and the at least one fourth requested read file block is not in the second disparate storage based on the second set of file block locations:

update the second set of file block locations to include the one fourth requested read file block;

copy the at least one fourth requested read file block from the first storage system to the second disparate storage system based on the second set of file block locations; and read the at least one fourth requested read file block from a fourth in-use block location based on the second set of file block locations.

18. A file server system for storing a file image including a plurality of file image blocks, the system comprising:
a first storage system;
a second disparate storage system; and
a file server, the file server configured to:
maintain a first set of file block locations of at least a first portion of the plurality of file image blocks that are located in the first storage system;
maintain a second set of file block locations of at least a second portion of the plurality of file image blocks that are located in the second disparate storage system;
receive a plurality of client file requests; and
service the plurality of client file requests based on the second set of file block locations;
wherein at least a plurality of in-use file blocks corresponding to the second set of file block locations are maintained in the second disparate storage system based on a plurality of eviction times that are corresponding to the plurality of in-use blocks and based on a cost optimization;
wherein the cost optimization is based on a first data access monetary cost and a first data storage monetary cost associated with fetching at least a portion of the plurality of in-use file blocks from the first storage system and a second data access monetary cost and a second data storage monetary cost associated with fetching at least a portion of the plurality of in-use file blocks from the second storage system; and
wherein the plurality of client file requests comprises at least one of:
a first portion of the plurality of client file requests being read requests to read a plurality of requested read file blocks corresponding to the first portion of the plurality of client file requests; and
a second portion of the plurality of client file requests being write requests to write a plurality of received write file blocks corresponding to the second portion of the plurality of client file requests.

19. The system of claim 18, wherein file server is further configured to:
allocate a storage volume in the second disparate storage system;
perform at least one of:
mark a plurality of the plurality of requested read file blocks for deletion based on a plurality of read eviction times corresponding to the plurality of requested read file blocks;
mark a plurality of the plurality of received write file blocks for deletion based on a plurality of read eviction times corresponding to the plurality of requested read file blocks; and
resize the allocated storage volume based on the plurality of requested read file blocks and the plurality of received write file blocks that are marked for deletion.

20. A method for handling a received file request, comprising:
at a processor communicatively coupled to a data storage, maintaining a first set of file block locations of at least a portion of the plurality of file image blocks that are located in a first storage system of the plurality of disparate storage systems; and
maintaining, by the processor in cooperation with the data storage, a second set of file block locations of at least a portion of the plurality of file image blocks that are located in a second disparate storage system of the plurality of disparate storage systems;
wherein at least a plurality of in-use file blocks corresponding to the second set of file block locations are maintained in the second disparate storage system based on a plurality of eviction times that are corresponding to the plurality of in-use blocks and based on a cost optimization; and
wherein the cost optimization is based on a first data access monetary cost and a first data storage monetary cost associated with fetching at least one of the plurality of in-use file blocks from the first storage system and a second data access monetary cost and a second data storage monetary cost associated with fetching at least a portion of the plurality of in-use file blocks from the second storage system.

21. The method of claim 20, wherein at least one of the plurality of eviction times is further based on a service level agreement.

22. The method of claim 20, wherein the cost optimization attempts to minimize an operational monetary cost.

23. The method of claim 22, wherein at least one of the plurality of eviction times is further based on a crossover time, the crossover time being based on when the attempted minimized operational monetary cost shifts from storing at least one of the plurality of in-use file blocks in one of the first or second storage systems to the other of the first or second storage systems.

24. The method of claim 20, wherein at least one of the plurality of eviction times is based on a probability density function.

* * * * *